(12) United States Patent
Lunesu et al.

(10) Patent No.: US 10,080,018 B2
(45) Date of Patent: Sep. 18, 2018

(54) VIDEO CONTENT CLASSIFICATION

(71) Applicant: Owtware Holdings Limited, BVI, Shanghai (CN)

(72) Inventors: Lionello Giuseppe Giovanna Lunesu, Shanghai (CN); Douglas Allen Walter, Shanghai (CN)

(73) Assignee: Owtware Holdings Limited, BVI, Shanghai (CN)

( * ) Notice: Subject to any disclaimer, the term of this patent is extended or adjusted under 35 U.S.C. 154(b) by 165 days.

(21) Appl. No.: 15/128,183

(22) PCT Filed: Mar. 25, 2014

(86) PCT No.: PCT/CN2014/074014
§ 371 (c)(1),
(2) Date: Sep. 22, 2016

(87) PCT Pub. No.: WO2015/143619
PCT Pub. Date: Oct. 1, 2015

(65) Prior Publication Data
US 2017/0104995 A1    Apr. 13, 2017

(51) Int. Cl.
*H04N 19/12*    (2014.01)
*H04N 19/15*    (2014.01)
(Continued)

(52) U.S. Cl.
CPC ............. *H04N 19/12* (2014.11); *H04N 19/15* (2014.11); *H04N 19/154* (2014.11);
(Continued)

(58) Field of Classification Search
CPC ...... H04N 19/12; H04N 19/15; H04N 19/154; H04N 19/172; H04N 19/176; H04N 19/182; H04N 19/186; H04N 19/625
See application file for complete search history.

(56) References Cited

U.S. PATENT DOCUMENTS

2011/0181744 A1    7/2011   Hojo et al.
2011/0262051 A1    10/2011   Morard et al.
(Continued)

FOREIGN PATENT DOCUMENTS

CN    102217299 A    10/2011
CN    102308582 A    1/2012
(Continued)

OTHER PUBLICATIONS

Chinese Patent Office (ISA/CN)—International Search Report and Written Opinion for PCT/CN2014/074014 (dated Dec. 31, 2014).

*Primary Examiner* — Francis G Geroleo
(74) *Attorney, Agent, or Firm* — Fish & Richardson P.C.

(57) ABSTRACT

Methods, systems and apparatus, including computer programs encoded on computer storage media, for video content classification. A video content classification system classifies input video data frame by frame. The video content classification system performs customized discrete cosine transform (DCT) operations on each frame. The video content classification system then determines, based on results of the DCT operations, how much image information in the frame may be lost due to compression. If the loss is estimated to be below a threshold value, the video content classification system applies a high data compression ratio algorithm to compress the frame. Otherwise, the video content classification system applies a low data compression ratio algorithm to compress the frame. The video content classification system may generate output video data that is compressed differently frame by frame.

22 Claims, 7 Drawing Sheets

(51) Int. Cl.
    *H04N 19/154*    (2014.01)
    *H04N 19/625*    (2014.01)
    *H04N 19/172*    (2014.01)
    *H04N 19/182*    (2014.01)
    *H04N 19/176*    (2014.01)
    *H04N 19/186*    (2014.01)

(52) U.S. Cl.
    CPC ......... *H04N 19/625* (2014.11); *H04N 19/172* (2014.11); *H04N 19/176* (2014.11); *H04N 19/182* (2014.11); *H04N 19/186* (2014.11)

(56) References Cited

U.S. PATENT DOCUMENTS

| | | | |
|---|---|---|---|
| 2012/0027317 A1* | 2/2012 | Choi | G06F 3/041 |
| | | | 382/244 |
| 2014/0146874 A1* | 5/2014 | Ju | H04N 5/23241 |
| | | | 375/240.02 |
| 2015/0103880 A1* | 4/2015 | Diard | H04N 19/162 |
| | | | 375/240.02 |
| 2015/0208072 A1* | 7/2015 | Chen | H04N 19/172 |
| | | | 375/240.02 |

FOREIGN PATENT DOCUMENTS

| | | |
|---|---|---|
| CN | 102656886 A | 9/2012 |
| JP | 2004214740 A | 7/2004 |

* cited by examiner

VIDEO CONTENT CLASSIFICATION

TECHNICAL FIELD

This disclosure relates generally to data compression.

BACKGROUND

Sending large amount of video data over a computer network is bound by size of the video data and throughput of connection of the computer network. Compressing the video data before sending the data can result in faster transmission. Various conventional compression algorithms are available. However, a compression algorithm that works well on a portion of a video may result in unacceptable quality when used on another portion of the video. A conventional system for sending video data over a computer network may choose to use a low data compression ratio algorithm that compresses less to preserve quality. Low data compression ratio, however, results in larger sized compressed data. To compensate, the system can reduce the video frame rate to send fewer frames per second.

SUMMARY

A video content classification system classifies input video data frame-by-frame. The video content classification system performs customized discrete cosine transform (DCT) operations on each frame. The video content classification system then determines, based on results of the DCT operations, how much image information in the frame may be lost due to compression. If the loss is estimated to be below a threshold value, the video content classification system applies a high data compression ratio algorithm to compress the frame. Otherwise, the video content classification system applies a low data compression ratio algorithm to compress the frame. The video content classification system may generate output video data that is compressed differently frame-by-frame.

The features described in this specification can be implemented to achieve one or more advantages. For example, in some cases, the techniques described in this specification can maximize data compression ratio, which is a ratio between uncompressed data and compressed data, without sacrificing video quality. By employing multiple compression algorithms for a video, a video content classification system can avoid having to compromise between losing frame rate, losing quality, and a large result data size. These compromises are common in conventional video compression systems.

The video content classification system uses an efficient algorithm to classify video content. Overhead of the classification can be minimal, and the algorithm is sufficiently fast to be applied real time.

The details of one or more implementations of the subject matter are set forth in the accompanying drawings and the description below. Other features, aspects and advantages of the subject matter will become apparent from the description below, the drawings and the claims.

DETAILED DESCRIPTION

Figure 1:
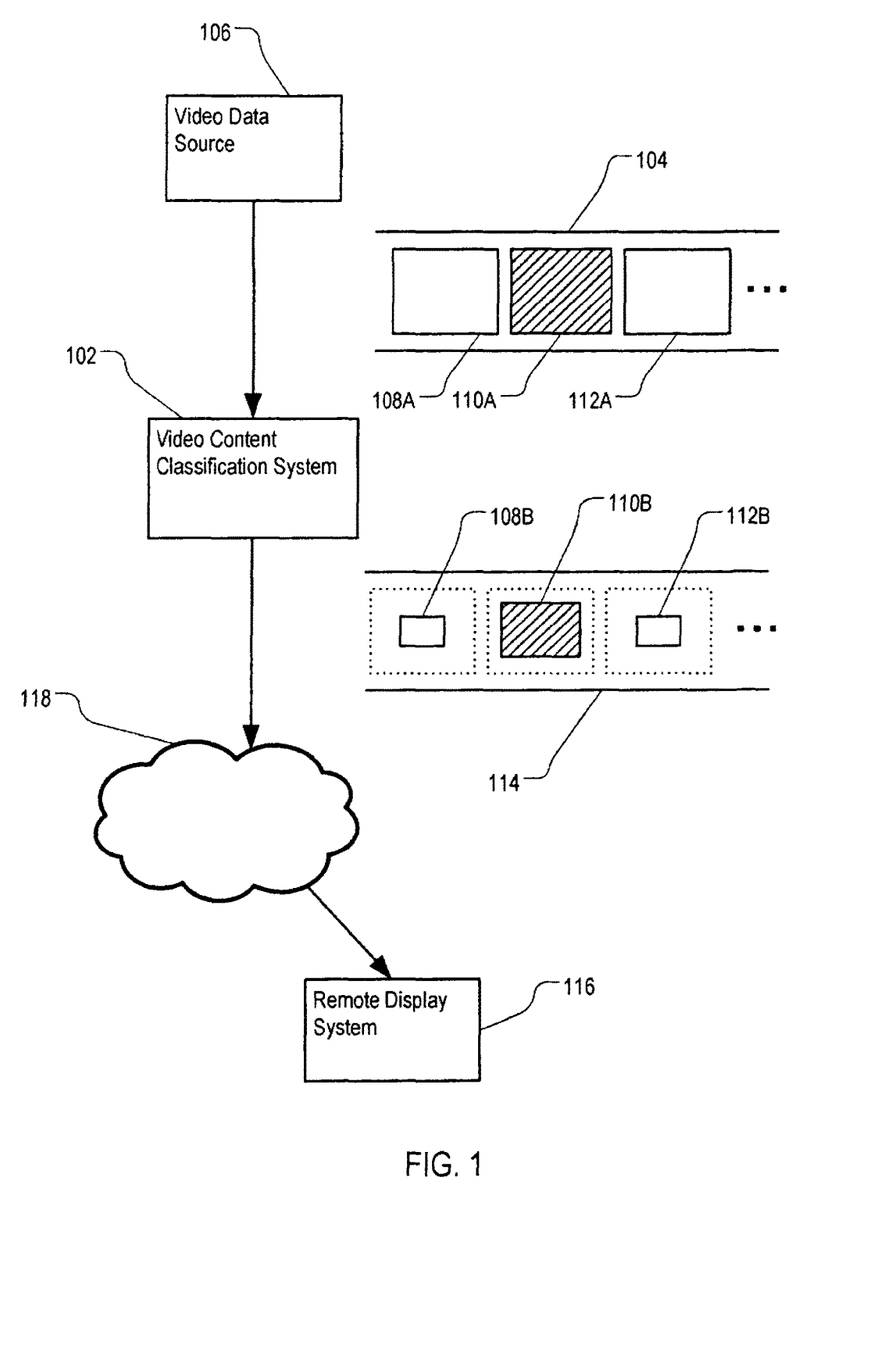
FIG. 1 is a diagram illustrating operations of an example video content classification system.

A shown in FIG. 1, a video content classification system 102 receives video data 104 from a video data source 106. The video data source 106 can be a display buffer of a display device, e.g., a computer screen. The display buffer can be refreshed at a frame rate, e.g., 50 Hertz (Hz) or 60 Hz. The video data 104 can include content having high compressibility, e.g., a movie, that does not visibly degrade after being compressed using DCT-based compression algorithms, e.g., Joint Photographic Experts Group (JPEG) or Moving Picture Experts Group (MPEG) compression algorithms.

The video data 104 includes a sequence of frames, e.g., frames 108A, 110A, and 112A. Each frame can correspond to display content of an entire screen or a portion of the content. At a given time, the display content of an entire screen can be represented by a single frame, or by multiple independent frames. For example, a movie being played can occupy an entire screen or a movie window portion of the screen. The screen may display multiple windows. Each window can have a respective and distinct sequence of frames. Each sequence of frames may be associated with location information specifying where on the screen the sequence of frame is located.

Each frame includes an image that corresponds to at least a portion of content of the display buffer at a given time. The image can be represented, for example, by multiple digital pixels. Each pixel includes values of color components, for example, intensity of red, green and blue colors, respectively.

Some frames, e.g., the frames 108A and 112A, may be movie frames that are more compressible than other frames, e.g., the frame 110A, which contains text. When being compressed by the same DCT-based compression algorithm, the image resulting from the frame 108A will lose less information than the image resulting from the frame 110A. The video content classification system 102 determines an information loss score for each of the frames 108A, 110A, and 112A that measures how compressible each of the frames 108A, 110A, and 112A is. A lower information loss score indicates lower information loss after compression, and higher compressibility. For example, when compressed at a given data compression ratio, e.g., two-to-one, using a DCT-based compression algorithm, the frame 108A may not have significant signal loss. The resulting compressed image may be visually unchanged. Accordingly, the frame 108A has a low information loss score and can be designated as having high compressibility. By comparison, when compressed at the same data compression ratio using the same DCT-based compression algorithm, the frame 110A may have significant signal loss and may be deteriorated significantly. Accordingly, the frame 110A has a high information loss score and can be designated as having low compressibility. Additional details on how to determine an information loss score for a frame are described below in reference to FIG. 6.

The video content classification system 102 compresses the frames 108A, 110A and 112A differently according to their respective information loss scores. For a frame having a low information loss score, e.g., the frame 108A or 112A, the video content classification system 102 performs the compression, or causes an external compressor to perform the compression, using a compressing algorithm, e.g., a DCT based compression algorithm, that has a high data compression ratio. For a frame having a high information loss score, the video content classification system 102 performs the compression, or causes an external compressor to perform the compression, using a non-DCT based compression algorithm that is lossless or a DCT based compression algorithm that has a low data compression ratio. The "high" or "low" data compression ratios are relative to the content in the frames 108A, 110A, and 112A. It is possible that a low data compression ratio algorithm results in a final data compression ratio higher than what would have been achieved with a high data compression ratio algorithm.

The video content classification system 102 generates compressed video data 114. The compressed video data 114 includes a sequence of the compressed frames 108B, 110B and 112B, corresponding to the original frames 108A, 110A and 112A, respectively. The video content classification system 102 then can send the compressed video data 114 to a remote display system 116, through a computer network 118, for display.

Figure 2:
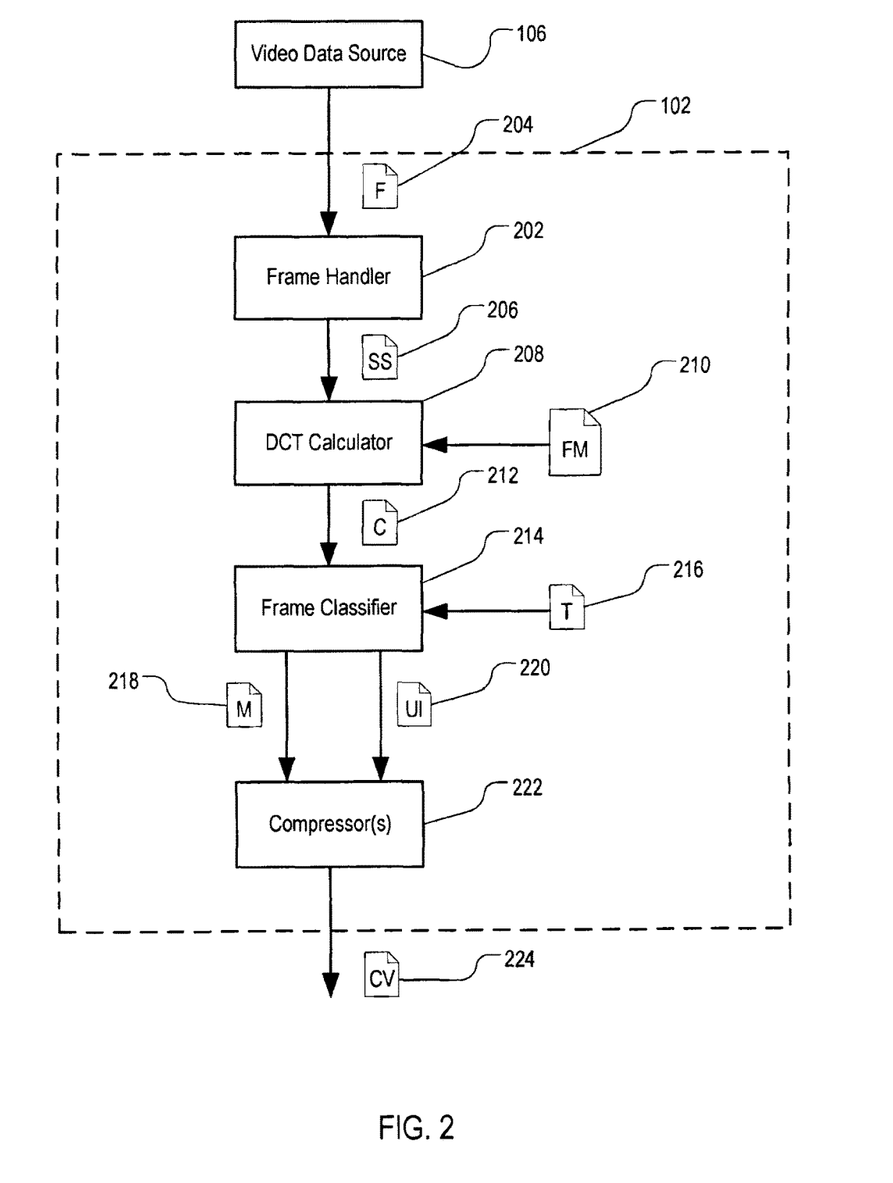
FIG. 2 is a block diagram illustrating example components of example video content classification system and interactions of the components.

FIG. 2 is a block diagram illustrating example components of the video content classification system 102 and interactions among the components. Each component of the video content classification system 102 can include hardware, e.g., a processor, software, e.g., computer instructions, or both.

The video content classification system 102 includes a frame handler 202. The frame handler 202 is a component of the video content classification system 102 configured to receive video data 204 from the video data source 106. The video data 204 includes multiple frames. The frame handler 202 selects and processes a subsection for each frame in the video data 204, and submits the processed subsection 206 to a DCT calculator 208 for further processing. Additional details of selecting and processing a subsection of a frame are described below in reference to FIGS. 3-4.

The DCT calculator 208 is a component of the video content classification system 102 configured to compute an information loss score for each frame by performing customized DCT operations on the processed subsection 206 of the frame. To expedite the computations, the DCT calculator 208 can use a pre-calculated constant table 210. The DCT calculator 208 tags the information loss score with each respective frame to generate tagged frames 212. The DCT calculator 208 submits the tagged frames 212 to a frame classifier 214 for classification. Additional details of the operations of the DCT calculator 208 and the constant table 210 are described below in reference to FIG. 6.

The frame classifier 214 is a component of the video content classification system 102 configured to classify each frame based on the information loss score associated with that frame. The frame classifier 214 performs the classification based on one or more compression thresholds 216. For example, upon determining that the information loss score of a frame 218 is lower than a pre-determined compression threshold 216, the frame classifier 214 classifies the frame 218 as a movie frame. Likewise, upon determining that the information loss score of a frame 220 is higher than the compression threshold 216, the frame classifier 214 classifies the frame 220 as a graphical user interface frame or text frame. The frame classifier 214 can submit the movie frame 218 and the graphical user interface frame 220 to one or more compressors 222.

The compressor(s) 222 can be a component of the video content classification system 102 or a separate system coupled to the video content classification system 102. The compressor(s) 222 compress the movie frame 218 differently from the graphical user interface frame 220 by applying different compression algorithms or using different data compression ratios. The compressor(s) 222 then stitch the compressed frames 218 and 220, and other compressed frames, into compressed video 224 that is suitable for transmission over a computer network.

Figure 3:
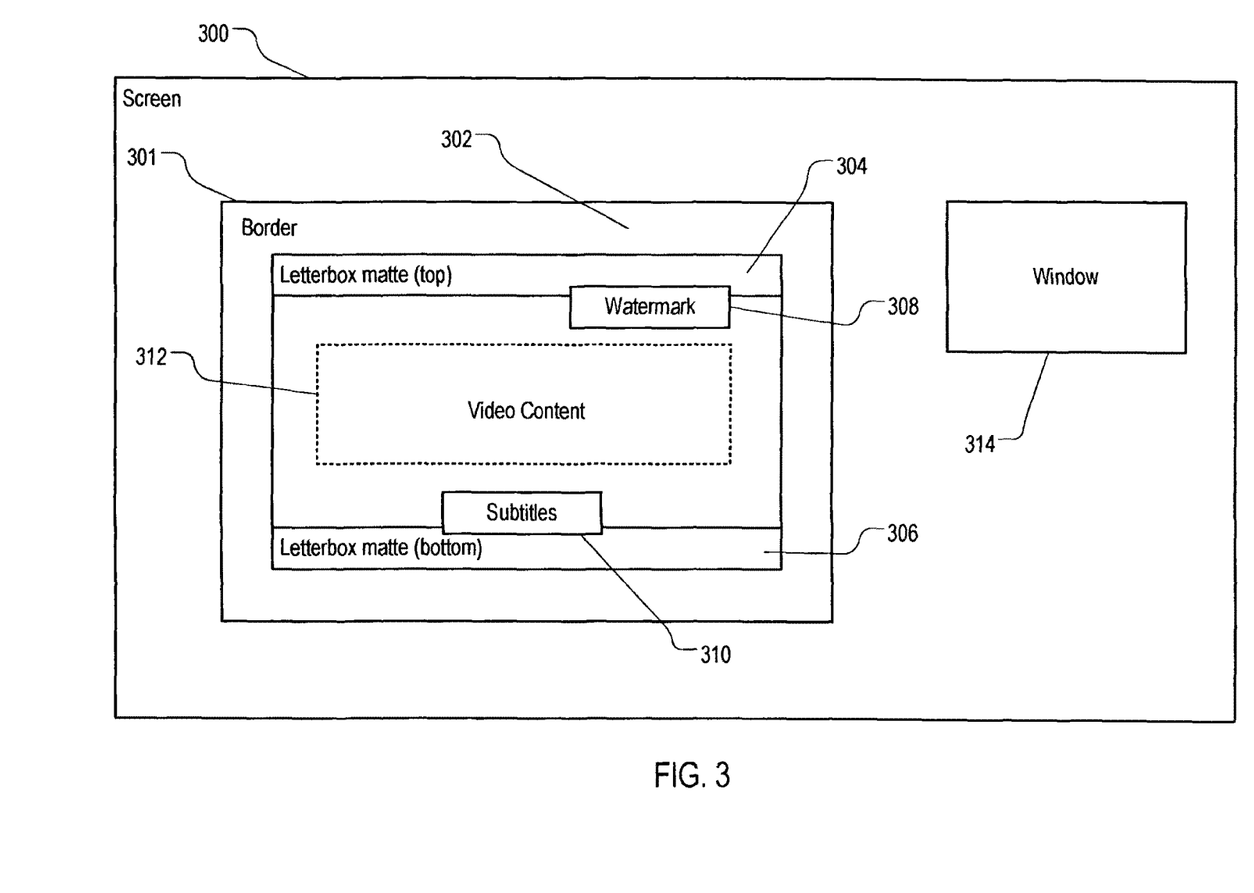
FIG. 3 illustrates example techniques of selecting video content to perform classification.

FIG. 3 illustrates example techniques of selecting video content to perform classification. A display screen 300 displays a frame 301. Frame 301 is a frame of a sequence of frames of video data. The frame 301 can include, for example, movie content and artifacts that are unrelated to the movie content. The artifacts can include one or more of a static border 302, a top letterbox matte 304, a bottom letterbox matte 306, a watermark 308, or a subtitle 310.

A frame handler, e.g., the frame hander 202 of FIG. 2, selects a subsection 312 of the frame 301 for computing the information loss score of the frame 301. The system can select the subsection 312 that is located at the center of the frame 301 and covers a pre-defined ratio (e.g., X percent in height and Y percent in width) of the frame 301 to avoid the artifacts.

In addition, the display screen 300 can display a frame 314 independently from displaying the frame 301. The frame 314 may be a movie frame, a graphical user interface frame, or a text frame. The system can select content from the frame 314 and classify the frame 314 simultaneously with and separately from processing the frame 301. The system can store locations of frames 301 and 314 for rendering compressed frames.

Figure 4:
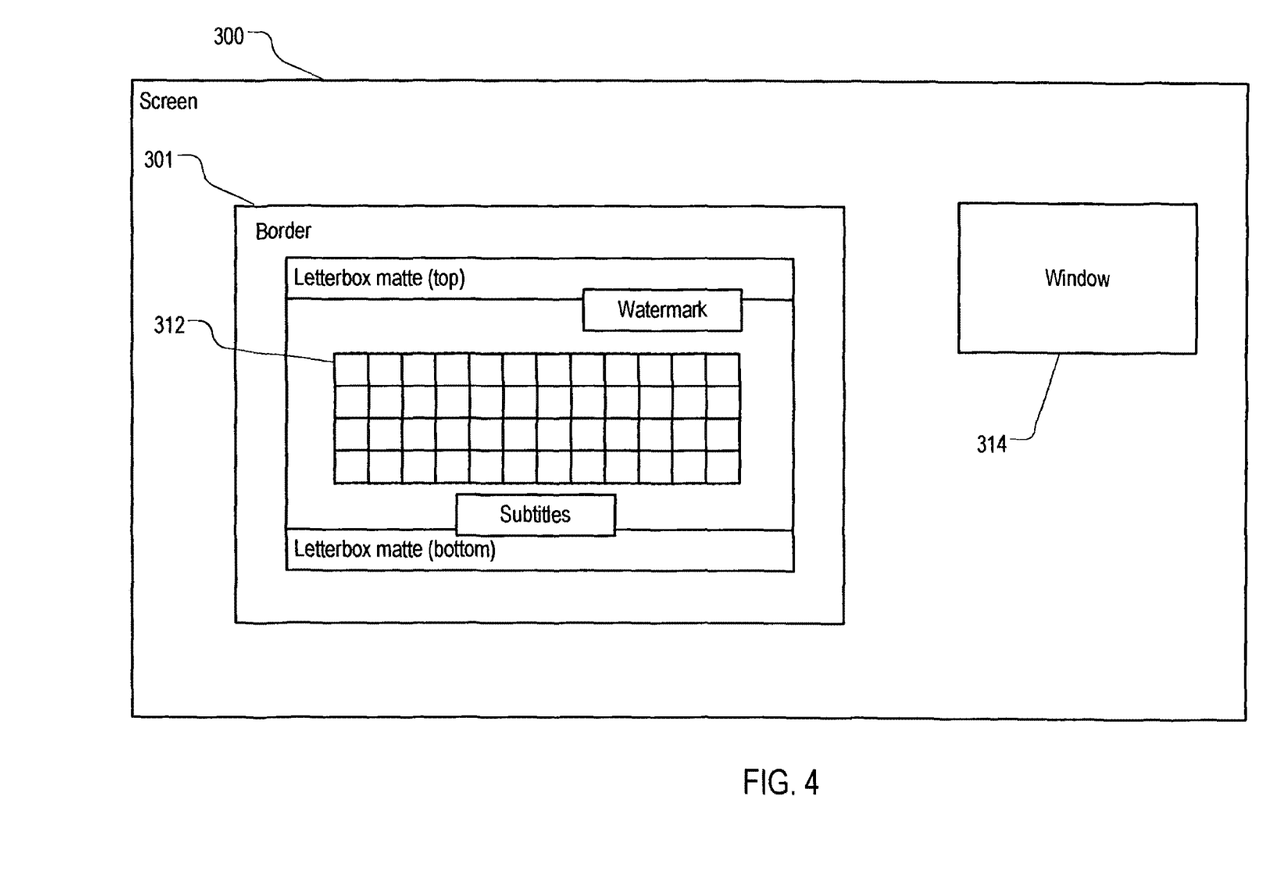
FIG. 4 is a diagram illustrating examples techniques of selecting blocks of pixels for classification.

FIG. 4 is a diagram illustrating example techniques of selecting blocks of pixels for classification. The frame handler divides the subsection 312 of the frame 301 into multiple blocks of pixels. Each block of pixels can be designated as a macro block. Each block of pixels can be M pixels wide and N pixels high. In some implementations, M and N each have a value of eight.

The frame handler then determines a pixel color component that most affects human psychovisual system. For pixels decomposed into red, green and blue components, the system can select the green component values for pixels in each macro block. For pixels decomposed into luminance and chrominance components, the frame handler can select the luminance component. The DCT calculator 208 (of FIG. 2) then computes an information loss score of the frame 301 using the selected pixel color component for each macro block. Additional details of the calculation are described in reference to FIG. 6.

Figure 5:
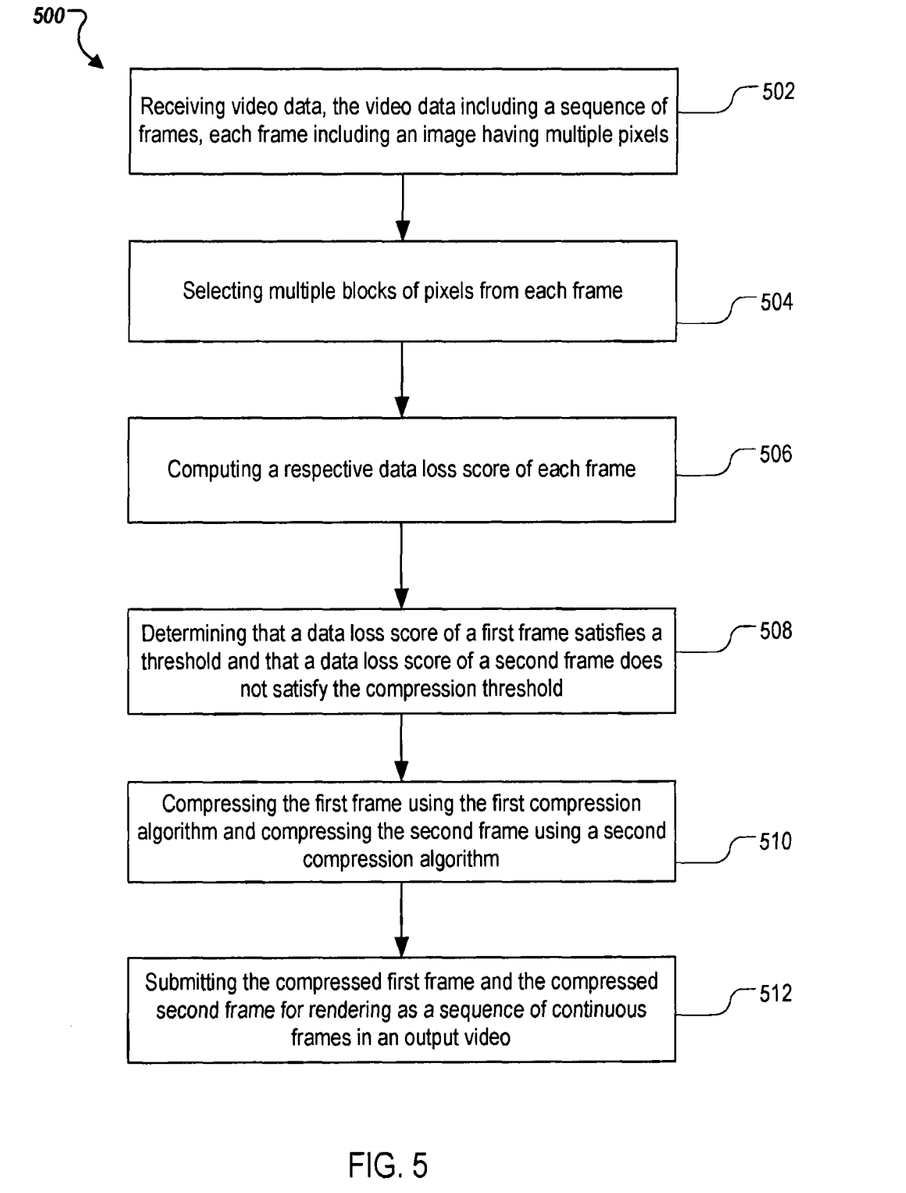
FIG. 5 is a flowchart illustrating an example of a procedure of video content classification.

FIG. 5 is a flowchart illustrating an example of a procedure 500 of video content classification. Procedure 500 can be performed by the video content classification system 102 of FIG. 2.

The system receives (502) video data from a video data source. The video data includes one or more sequences of frames. Each frame includes an image having multiple pixels. Each sequence of frames can correspond to at least a portion of content displayed on a display screen.

The system selects (504) multiple blocks of pixels from each frame. Selecting the blocks includes determining a subsection of each respective frame that is representative of the image in the respective frame. In addition, selecting the blocks includes selecting the blocks of pixels that are located in the subsection of the respective frame. The subsection of a frame can be a portion of the frame that is located at the center of the frame.

The system computes (506) a respective information loss score of each frame. The information loss score indicates an estimated degree of loss of information in the image in a respective frame upon compressing the respective frame using a first compression algorithm. The first compression algorithm can be a DCT based compression algorithm, e.g., a JPEG or MPEG algorithm.

In the illustrated example, the system determines (508) that an information loss score of a first frame in the sequence of frames satisfies a compression threshold, e.g., $0 \leq G[1] \leq T$, where $G[1]$ is the information loss score of the first frame, and T is the compression threshold. In addition, the system determines that an information loss score of a second frame in the sequence of frames does not satisfy the compression threshold, e.g., $G[2] > T$, where $G[2]$ is the information loss score of the second frame. The system then can determine that the first frame has high compressibility and that the second frame has low compressibility.

The system can determine the compression threshold T by performing calibration operations. For example, the system can compute information loss scores for frames in a set of preselected videos of different types. The system can determine a representative information loss score for each type of video, e.g., movies, graphics, texts, or mixture. The system then determines the compression threshold based on the different information loss score for different types of videos.

Based on whether the information loss scores satisfy the compression threshold, the system compresses (510) the first frame that has a high compressibility using the first compression algorithm, and compresses the second frame that has a low compressibility using a second compression algorithm that is different from the first compression algorithm. The second compression algorithm can be, or example, a lossless compression algorithm or a DCT based compression algorithm with a data compression ratio that is lower than the data compression ratio of the first compression algorithm.

The system then submits (512) the compressed first frame and the compressed second frame for rendering as a sequence of continuous frames in an output video for display on a display device. The compressed first frame and the compressed second frame can be submitted to the display device through a computer network. When the compressed first frame and second frame represent different content, e.g., different windows on a same display screen, the system can place the compressed first frame and second frame represent at respective locations on the display screen according to locations occupied by the original first frame and second frame.

Figure 6:
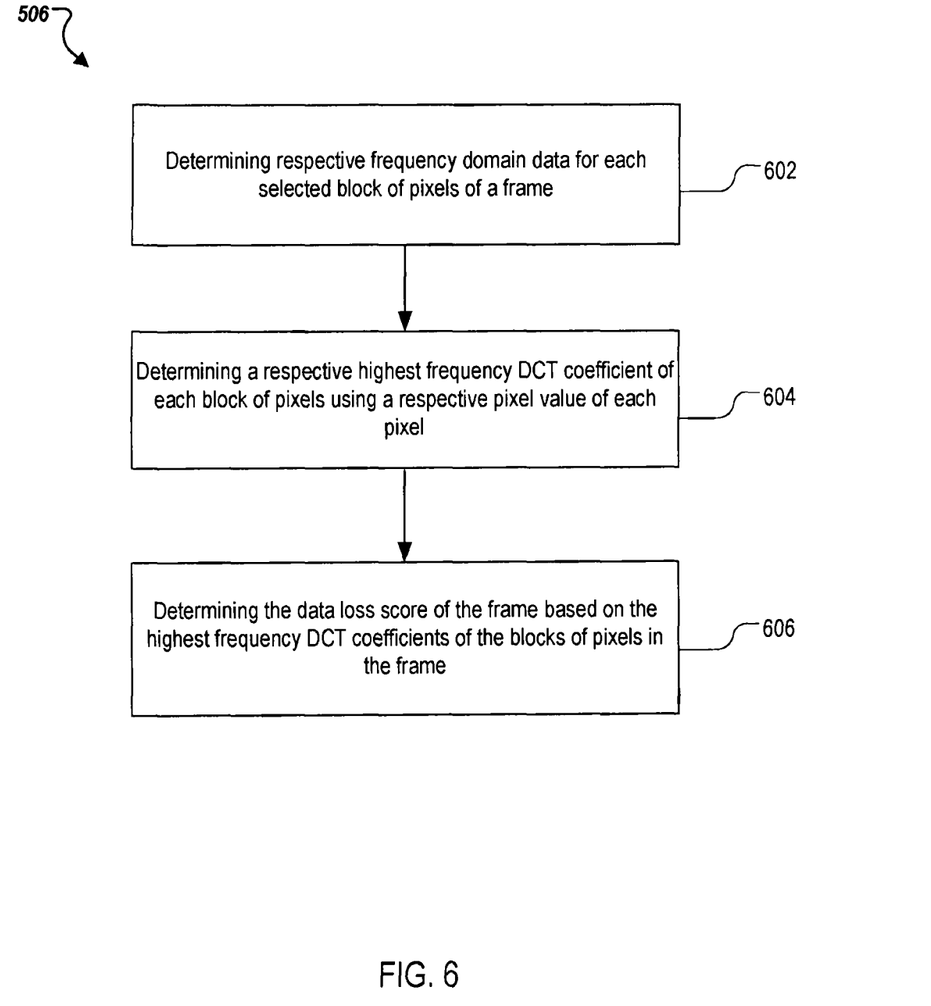
FIG. 6 is a flowchart illustrating an example of a procedure of determining an information loss score of a frame in a video.

FIG. 6 is a flowchart illustrating an example of a procedure 506 of determining an information loss score of a frame in a video. The system determines (602) respective frequency domain data for each selected block of pixels of the frame by applying DCT operations to the block of pixels.

The system determines (604) a highest frequency DCT coefficient of each block of pixels using a respective pixel value of each pixel. Each block is a macro block including two-dimensional array of pixels. The pixel value of each pixel is a color component of the pixel that is determined to affect a human psychovisual system most. For example, the system selects a green color component if the pixel is decomposed into red, green and blue. The system selects a luminance component if the pixel is decomposed into luminance and chrominance. The system then designates the selected green color component or luminance component as the pixel value of the pixel.

The system computes the highest frequency DCT coefficient of a two-dimension DCT over the chosen pixel values in the macro block. The system computes the highest frequency DCT coefficient using customized DCT operations that are optimized for real-time video content classification. For example, the system can be configured to compute only one or two DCT coefficients corresponding to the highest horizontal spatial frequency and the highest vertical frequency and to disregard other DCT coefficients. The system can exclude from conventional DCT operations those operations for computing DC coefficients and lower frequency AC coefficients.

In some implementations, e.g., when each macro block is eight pixels wide and eight pixels high, the system can avoid normalization of the DCT coefficient by performing the following type-II DCT calculation.

$$G_n = \sum_{x=0}^{7} \sum_{y=0}^{7} g_{x,y} \cos\left[\frac{(2x+1)7\pi}{16}\right] \cos\left[\frac{(2y+1)7\pi}{16}\right] \quad (1)$$

In calculation (1), n is an index of a macro block for which the DCT coefficient is being calculated. The values x and y, each ranging from zero to seven, are horizontal and vertical coordinates of a pixel, relative to macro block n. The value $g_{x,y}$ is a pixel value at coordinates (x, y) relative to the macro block n. The value $G_n$ is a non-normalized highest frequency DCT coefficient for macro block n.

In some implementations, the system pre-computes the two cosine terms of calculation (1) into constant table 210 of FIG. 2. The constant table is a two-dimensional array C, where the value $C_{x,y}$ at a location x, y in the array C is calculated as follows.

$$C_{x,y} = \cos\left[\frac{(2x+1)7\pi}{16}\right] \cos\left[\frac{(2y+1)7\pi}{16}\right] \quad (2)$$

The system then computes the non-normalized highest frequency DCT coefficient for macro block n using summation of element-wise product of the pixel values and values in the constant table as follows.

$$G_n = \sum_{x=0}^{7} \sum_{y=0}^{7} g_{x,y} C_{x,y} \quad (3)$$

The system determines (606) the information loss score of the frame based on the highest frequency DCT coefficients of the blocks of pixels in the frame. The system can designate a highest frequency DCT coefficient $G_n$ of a block of pixels in the frame that has the maximum absolute value for each n as the information loss score G of the frame. The information loss score G of the frame can be calculated as follows.

$$G = \max(|G_0|, |G_1|, \ldots |G_n|) \quad (4)$$

Upon determining that a frame has a higher G value, the system can determine that stronger high-frequency signal is present in this frame. Upon determining that a frame has a lower G value, the system can determine that weaker high-frequency signal is present in this frame.

Figure 7:
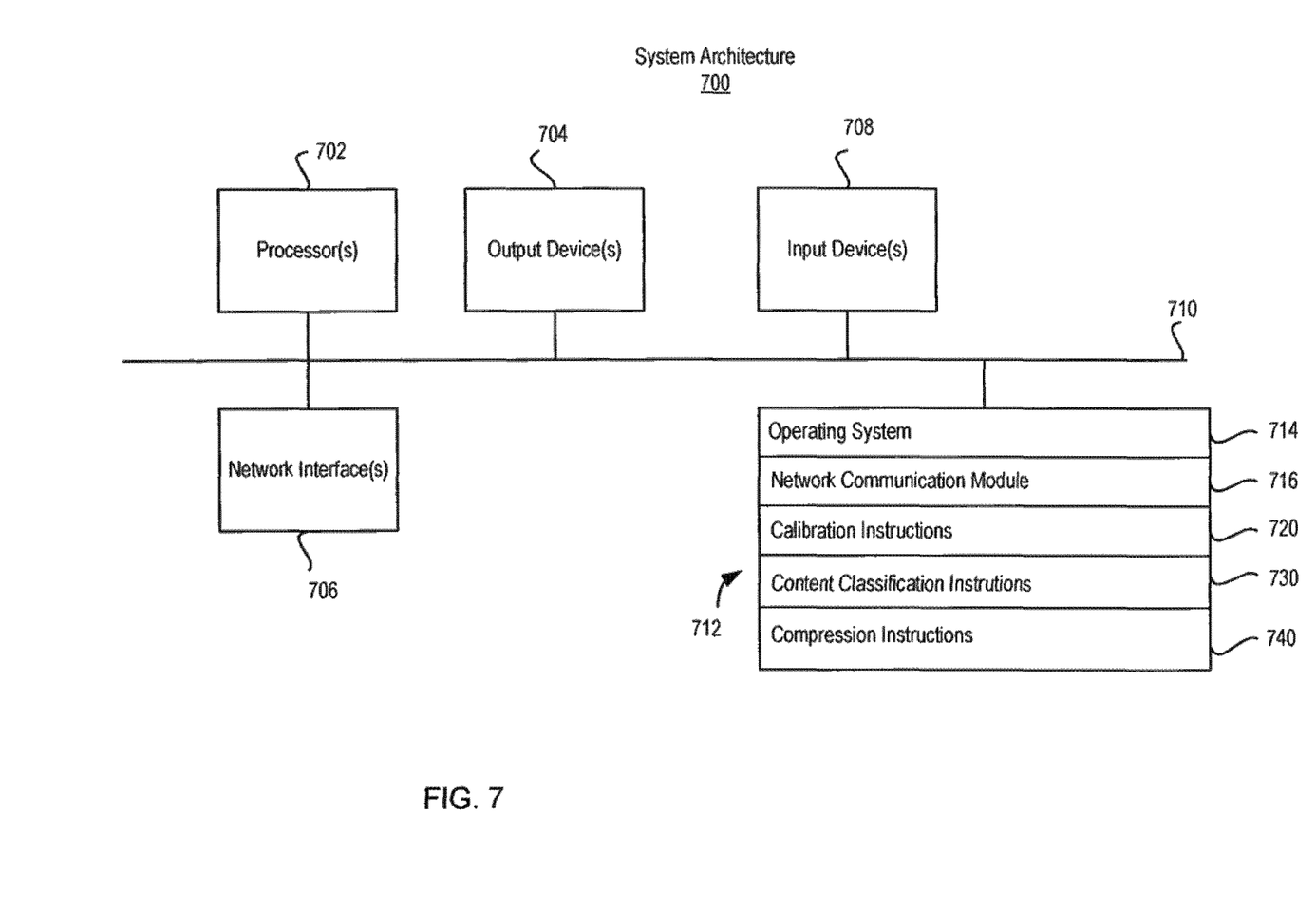
FIG. 7 is a block diagram of example of a system architecture for implementing the features and operations of FIGS. 1-6.

FIG. 7 is a block diagram showing an example of a system architecture for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., an interface to a LCD monitor), one or more network interfaces 706, one or more input devices 708 (e.g., a mouse, keyboard, touch-sensitive display, or a remote control) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to any medium that participates in providing instructions to processor 702 for execution, including without limitation, non-volatile media (e.g., optical or magnetic disks), volatile media (e.g., memory) and transmission media. Examples of transmission media include, without limitation, coaxial cables, copper wire and fiber optics.

Computer-readable medium 712 can further include operating system 714 (e.g., Mac OS® server, Windows Server®, UNIX®, Linux®, or iOS®), network communication module 716, calibration instructions 720, content classification instructions 730, and compression instructions 740. Operating system 714 can be multi-user, multiprocessing, multitasking, multithreading, real-time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.). Calibration instructions 720 can include computer instructions that, when executed, cause processor 702 to perform operations of determining a compression threshold. Content classification instructions 730 can include computer instructions that, when executed, cause processor 702 to perform operations of selecting subsections of frames, computing data loss scores, and classifying a frame as compressible if the data loss score of that frame is lower than the compression threshold, or incompressible if the data loss score of that frame is higher than the compression threshold. Compression instructions 740 can include computer instructions that, when executed, cause processor 702 to perform frame compression using DCT-based compression algorithms or other compression algorithms.

Architecture 700 can be implemented, for example, in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, SQL, or Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be coupled operatively to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, various features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a PAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Although particular implementations are described above, various modifications can be made. The use of "first" and "second" in this specification does not necessarily indicate any particular sequence of the frames or operations. Accordingly, other implementations are within the scope of the claims.

What is claimed is:

1. A method comprising:
receiving, by one or more computers, video data, the video data comprising a sequence of frames, each frame including an image comprising a plurality of pixels;
selecting a plurality of blocks of pixels from each frame;
computing a respective information loss score of each frame, the information loss score indicating an estimated degree of loss of information in the image in a respective frame upon compressing the respective frame using a first compression algorithm;
wherein computing the respective information loss score of each frame comprises: determining respective frequency domain data for each selected block of pixels of the frame by applying discrete cosine transform (DCT) to the block of pixels; determining a respective highest frequency DCT coefficient of each block of pixels using a respective pixel value of each pixel; and determining the information loss score of the frame based on the highest frequency DCT coefficients of the blocks of pixels in the frame;
determining that an information loss score of a first frame in the sequence of frames satisfies a compression threshold and that an information loss score of a second frame in the sequence of frames does not satisfy the compression threshold;
in response, compressing the first frame using the first compression algorithm and compressing the second frame using a second compression algorithm that is different from the first compression algorithm; and
submitting the compressed first frame and the compressed second frame for rendering as a sequence of continuous frames in an output video for display on a display device.

2. The method of claim 1, wherein selecting the blocks of pixels comprises:
determining a subsection of each respective frame that is representative of the image in the respective frame; and
selecting the blocks of pixels that are located in the subsection of the respective frame.

3. The method of claim 1, wherein the pixel value of each pixel is a color component of the pixel that is determined to affect a human psychovisual system most.

4. The method of claim 3, wherein the color component of the pixel is a green component if the pixel is decomposed into red, green and blue, or a luminance component if the pixel is decomposed into luminance and chrominance.

5. The method of claim 1, wherein determining the information loss score of the frame comprises designating a highest frequency DCT coefficient of a block of pixels in the frame that has a maximum absolute value as the information loss score of the frame.

6. The method of claim 1, wherein the first compression algorithm is a discrete cosine transform (DCT) based compression algorithm, and the second compression algorithm is a lossless compression algorithm or a DCT based compression algorithm with a lower data compression ratio than the first compression algorithm.

7. The method of claim 1, wherein:
the video data is received from a display buffer, and
the compressed first frame and the compressed second frame are submitted to the display device through a computer network.

8. A non-transitory storage medium storing computer instructions operable to cause one or more computers to perform operations comprising:
receiving video data, the video data comprising a sequence of frames, each frame including an image comprising a plurality of pixels;
selecting a plurality of blocks of pixels from each frame;
computing a respective information loss score of each frame, the information loss score indicating an estimated degree of loss of information in the image in a respective frame upon compressing the respective frame using a first compression algorithm;
wherein computing the respective information loss score of each frame comprises: determining respective frequency domain data for each selected block of pixels of the frame by applying discrete cosine transform (DCT) to the block of pixels; determining a respective highest frequency DCT coefficient of each block of pixels using a respective pixel value of each pixel; and determining the information loss score of the frame based on the highest frequency DCT coefficients of the blocks of pixels in the frame;
determining that an information loss score of a first frame in the sequence of frames satisfies a compression threshold and that an information loss score of a second frame in the sequence of frames does not satisfy the compression threshold;
in response, compressing the first frame using the first compression algorithm and compressing the second frame using a second compression algorithm that is different from the first compression algorithm; and
submitting the compressed first frame and the compressed second frame for rendering as a sequence of continuous frames in an output video for display on a display device.

9. The non-transitory storage medium of claim 8, wherein selecting the blocks of pixels comprises:
determining a subsection of each respective frame that is representative of the image in the respective frame; and
selecting the blocks of pixels that are located in the subsection of the respective frame.

10. The non-transitory storage medium of claim 8, wherein the pixel value of each pixel is a color component of the pixel that is determined to affect a human psychovisual system most.

11. The non-transitory storage medium of claim 10, wherein the color component of the pixel is a green component if the pixel is decomposed into red, green and blue, or a luminance component if the pixel is decomposed into luminance and chrominance.

12. The non-transitory storage medium of claim 8, wherein determining the information loss score of the frame comprises designating a highest frequency DCT coefficient of a block of pixels in the frame that has a maximum absolute value as the information loss score of the frame.

13. The non-transitory storage medium of claim 8, wherein the first compression algorithm is a discrete cosine transform (DCT) based compression algorithm, and the second compression algorithm is a lossless compression algorithm or a DCT based compression algorithm with a lower data compression ratio than the first compression algorithm.

14. The non-transitory storage medium of claim 8, wherein:
the video data is received from a display buffer, and
the compressed first frame and the compressed second frame are submitted to the display device through a computer network.

15. A system comprising:
one or more processors; and
a non-transitory storage medium storing computer instructions operable to cause the one or more processors to perform operations comprising:
receiving, by one or more computers, video data, the video data comprising a sequence of frames, each frame including an image comprising a plurality of pixels;
selecting a plurality of blocks of pixels from each frame;
computing a respective information loss score of each frame, the information loss score indicating an estimated degree of loss of information in the image in a respective frame upon compressing the respective frame using a first compression algorithm;
wherein computing the respective information loss score of each frame comprises: determining respective frequency domain data for each selected block of pixels of the frame by applying discrete cosine transform (DCT) to the block of pixels; determining a respective highest frequency DCT coefficient of each block of pixels using a respective pixel value of each pixel; and determining the information loss score of the frame based on the highest frequency DCT coefficients of the blocks of pixels in the frame;
determining that an information loss score of a first frame in the sequence of frames satisfies a compression threshold and that an information loss score of a second frame in the sequence of frames does not satisfy the compression threshold;
in response, compressing the first frame using the first compression algorithm and compressing the second frame using a second compression algorithm that is different from the first compression algorithm; and
submitting the compressed first frame and the compressed second frame for rendering as a sequence of continuous frames in an output video for display on a display device.

16. The system of claim 15, wherein selecting the blocks of pixels comprises:
determining a subsection of each respective frame that is representative of the image in the respective frame; and
selecting the blocks of pixels that are located in the subsection of the respective frame.

17. The system of claim 15, wherein the pixel value of each pixel is a color component of the pixel that is determined to affect a human psychovisual system most.

18. The system of claim 17, wherein the color component of the pixel is a green component if the pixel is decomposed into red, green and blue, or a luminance component if the pixel is decomposed into luminance and chrominance.

19. The system of claim 15, wherein determining the information loss score of the frame comprises designating, a highest frequency DCT coefficient of a block of pixels in the frame that has a maximum absolute value as the information loss score of the frame.

20. The system of claim 15, wherein the first compression algorithm is a discrete cosine transform (DCT) based compression algorithm, and the second compression algorithm is a lossless compression algorithm or a DCT based compression algorithm with a lower data compression ratio than the first compression algorithm.

21. The system of claim 15, wherein:
the video data is received from a display buffer, and
the compressed first frame and the compressed second frame are submitted to the display device through a computer network.

22. A system comprising:
means for receiving video data, the video data comprising a sequence of frames, each frame including an image comprising a plurality of pixels;
means for selecting a plurality of blocks of pixels from each frame;
means for computing a respective information loss score of each frame, the information loss score indicating an estimated degree of loss of information in the image in a respective frame upon compressing the respective frame using a first compression algorithm;
wherein computing the respective information loss score of each frame comprises: determining respective frequency domain data for each selected block of pixels of the frame by applying discrete cosine transform (DCT) to the block of pixels; determining respective highest frequency DCT coefficient of each block of pixels using a respective pixel value of each pixel; and determining the information loss score of the frame based on the highest frequency DCT coefficients of the blocks of pixels in the frame;
means for determining that an information loss score of a first frame in the sequence of frames satisfies a compression threshold and that an information loss score of a second frame in the sequence of frames does not satisfy the compression threshold;
means for compressing, in response to result of the determining, the first frame using the first compression algorithm and compressing the second frame using a second compression algorithm that is different from the first compression algorithm; and
means for submitting the compressed first frame and the compressed second frame for rendering as a sequence of continuous frames in an output video for display on a display device.

* * * * *